United States Patent
Bell et al.

(12)

(10) Patent No.: US 6,693,381 B2
(45) Date of Patent: Feb. 17, 2004

(54) LAMP AND FAN THERMAL CONTROL BY DIRECTED AIR FLOW

(75) Inventors: Dean A. Bell, Marcellus, NY (US); Richard A. Mechowski, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 0 days.

(21) Appl. No.: 10/319,755

(22) Filed: Dec. 13, 2002

(65) Prior Publication Data

US 2003/0137248 A1 Jul. 24, 2003

Related U.S. Application Data

(63) Continuation-in-part of application No. 09/893,196, filed on Jun. 27, 2001, now Pat. No. 6,498,423.

(51) Int. Cl.$^7$ .................................................. H01J 13/32
(52) U.S. Cl. ...................... 315/112; 362/264; 362/294; 362/373; 353/60; 313/24; 313/25; 392/407; 392/426
(58) Field of Search ........................... 315/76, 112, 117, 315/118; 362/264, 294, 296, 341, 362, 345, 373; 353/57, 52, 60, 98, 119; 392/407, 416, 422, 426; 313/24, 25, 11, 13, 46, 113, 623

(56) References Cited

U.S. PATENT DOCUMENTS

| 4,704,660 A | * 11/1987 | Robbins | 362/552 |
| 5,207,505 A | 5/1993 | Naraki et al. | 362/373 |
| 5,622,418 A | 4/1997 | Daijogo et al. | 353/97 |
| 6,007,205 A | * 12/1999 | Fujimori | 353/57 |

\* cited by examiner

*Primary Examiner*—Haissa Philogene
(74) *Attorney, Agent, or Firm*—Wall Marjama & Bilinski LLP

(57) ABSTRACT

A method for thermal control of a lamp assembly which includes an arc lamp, fan and an associated reflector enclosed within a sealed module. The method includes providing a predetermined air flow path within said module whereby a continuous flow of ambient air is passed over said lamp during lamp operation which reduces the operating temperature of the lamp and increases lamp life, and further including an opening or vent adjacent to the fan which functions to reduce the fan temperature in operation thereby increasing the operating life of the fan.

11 Claims, 3 Drawing Sheets

LAMP AND FAN THERMAL CONTROL BY DIRECTED AIR FLOW

This application is a continuation-in-part of Ser. No. 09/893,196 filed Jun. 27, 2001 now U.S. Pat. No. 6,498,423.

FIELD OF THE INVENTION

The invention relates to metal halide and mercury arc lamps and to the thermal control of a metal halide or mercury arc lamp and associated fan in operation through the use of a directed air flow.

BACKGROUND OF THE INVENTION

The invention in general relates to the thermal control of an arc lamp in operation and more specifically to the use of a directed air flow to the arc chamber of the lamp.

In the prior art it is common to use arc lamps with a reflector to form an assembly which are used in an enclosed housing or a sealed light module to provide directed light which is used for projector systems and the like. When used in an enclosed housing or sealed module, an arc lamp generates high internal heat which can result in short lamp life and high lamp infant mortality rate due to the localized heat generated by the lamp in combination with a reflector within the confines of the housing or module. In these instances, venting and laminar flow cooling techniques are often employed to lower thermal values such that system installation is possible. Yet, in systems of this type it is common that highly loaded arc lamps exhibit a short life of 200 hours and a high infant mortality rate of less than 100 hours with an average life of approximately 400 hours or 20–45% of rated life. Lamp life times of this duration are unacceptable and result in high replacement cost to the ultimate user and discourage their use in systems of the type described above.

In addressing the problems described above, the prior art has believed and been taught away from directing any coolant air flow directly onto the lamp chamber in that such an approach would be unsatisfactory, and result in instability of lumen output and color. There has therefore been a continuing need in the field for a system which would allow for extended lamp life without compromising stability of lumen output or color for arc lamps used in the systems described above.

SUMMARY OF THE INVENTION

It is therefore an object of the present invention to provide a method of lamp thermal control which overcomes the problems of the prior art described above.

It is another object of the present invention to provide a method for thermal control which increases the life of a sealed light module which includes an arc lamp, reflector and fan.

It is a further object of the present invention to provide for a method of lamp and fan thermal control which results in improved lamp and fan life.

It is another object of the present invention to provide a method for increasing lamp life without compromising stability.

It is yet another object of the present invention to provide a method of thermal control in which the arc lamp achieves thermal equilibrium in a relatively short time.

It is a further object of the present invention to provide a method for the thermal control of an arc lamp through the directed air flow to the interior at the lamp chamber and surrounding reflector.

It is a further object of the present invention to provide a method of increasing the life of an arc lamp assembly.

It is yet a further object of the present invention to provide for lamp and fan thermal control for an arc lamp positioned in an enclosed chamber which utilizes controlled direct air flow directly around and past the lamp chamber.

The invention is directed to situations where a lamp assembly, which includes an arc lamp and a reflector, is used in an enclosed housing or as a sealed module which acts as a high intensity light source. In the present invention, an ambient air flow is allowed to flow into the interior volume of a sealed light module defined by the reflector geometry, and pass over the lamp chamber at a critical angle from the vertical. Lamp thermal control is effected, resulting in a dramatic increase in lamp life and a reduction in infant mortality of the lamp. The process of the present invention overcomes the problems of the prior art in systems of this type, in that lamp failure caused by the early onset of devitrification of the lamp chamber and quartz to foil hermetic seal separation are eliminated. Through the use of this process the anode temperature dropped approximately 50–70° C., and the cathode temperature dropped approximately 30–40° C. By employing this invention lamp life is improved by a factor of 3.

The system described above includes a fan which facilitates the air flow and is usually positioned to operate in the exhaust mode. Because the air flow passing over the fan has been heated by being passed over the hot lamp, the heated air passing over the fan has been found to significantly reduce fan life and result in early failure of the system. In order to overcome early fan failure due to thermal stress, it has been discovered that the placement of a vent or opening, i.e. waste gate, formed adjacent to fan functions to lower the air flow temperature resulting in less thermal stress on the fan. More specifically, the waste gate functions to introduce additional ambient air at a lower temperature to heated air flow from the lamp which overall reduces the air flow temperature passing over the fan thereby increasing the life of the fan and light module.

BRIEF DESCRIPTION OF THE DRAWINGS

For a more complete understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
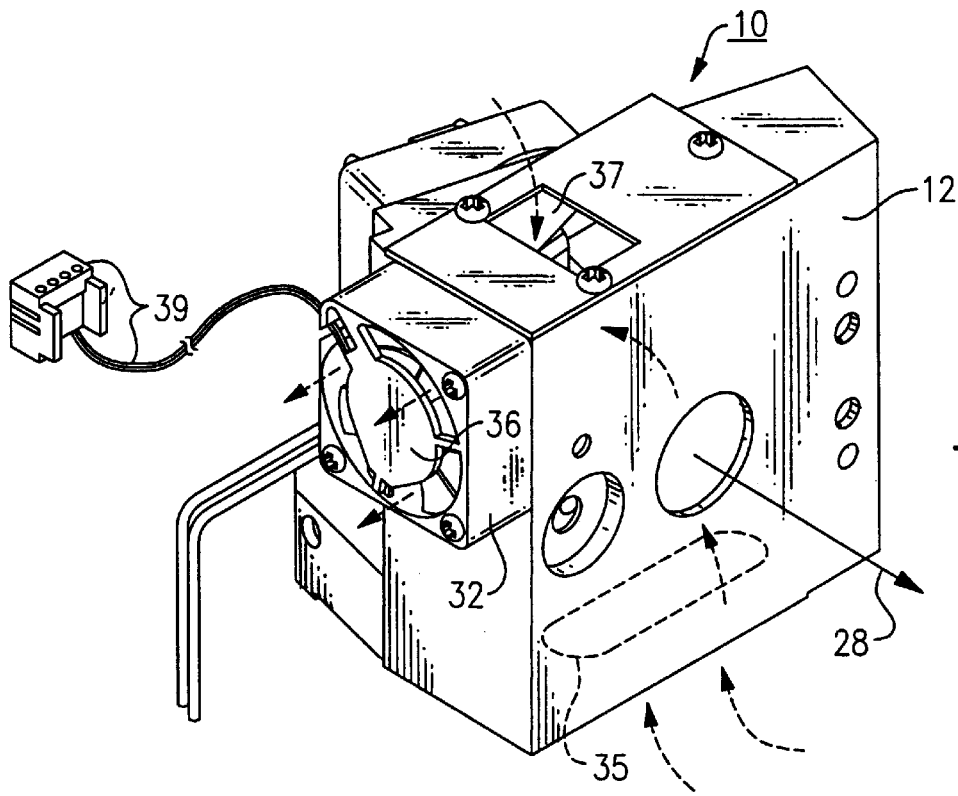
FIG. 1 is a perspective view of a sealed light module which utilizes the process of the present invention.
Figure 2:
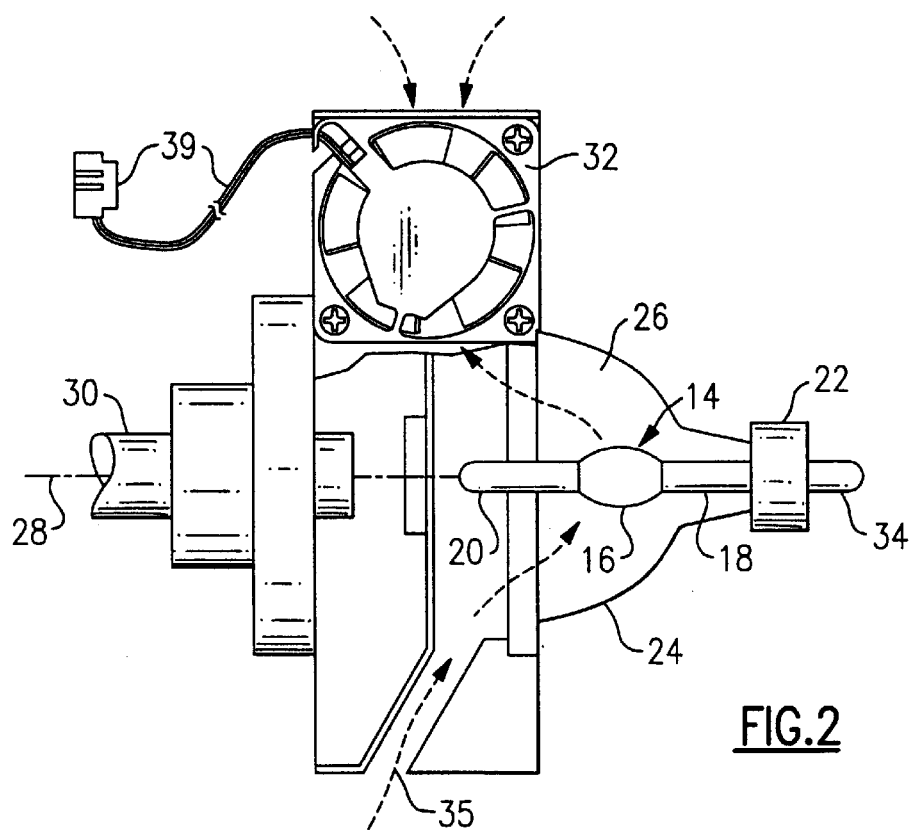
FIG. 2 is a side sectional view of the light module of FIG. 1.

The present invention is more fully understood with reference to FIGS. 1 and 2 of the drawings which illustrates a sealed light module 10 which contains an outer casing 12 which contains a lamp 14 having a bulb or internal sealed chamber 16, a cathode end 18, and an anode end 20 supported by connector 22. The lamp is surrounded at one end by a reflector 24 which has an interior volume 26, and is positioned to direct light along a path 28 and exiting at 30. A fan 32 together with an electrical connector and wire harness 39 is located at one end of the casing to the side of the lamp. Electrical connection to the lamp is made at the connector 22 having a pair of conductive pins 34.

Prior attempts to cool the arc lamp involved having an air intake under the lower edge of the reflector with the exhaust port being at the vertical top position. A main system fan was employed and subsequently a close coupled fan was employed to establish a laminar flow of air directly in front of the reflector. This resulted in some cooling of the very end of the tip of the lamp, typically the anode end. This was confirmed with the thermocouple readings. It was observed that although the anode seal may be cooled and may have a lower incidence of seal failure, the lamp life was insufficient. 25 Watt lamps were failing less than 200 hours with an average of 350 hrs, and 60 watt lamps were failing less than 400 hours with an average of 500 hours. The predominant mode of failure was arc chamber failure and there was evidence of early onset of devitrification of the highly thermal loaded quartz chamber. Increased airflow did not improve the situation. It was further observed that there were thermal cycles in the measurement of the end seal temperature. The lamps would take 20 to 30 minutes to reach thermal equilibrium, the point at which a narrow temperature cycle was observed.

An observation was made that if the chamber could be cooled as well as the seal then it may be possible to lengthen the life of the lamp. This was accomplished by directing the intake airflow directly toward the chamber. This is unconventional in metal halide use as the typical engineer would fear condensation of the mercury or metal halide salts with a resultant degradation in lumen and color performance. This is just not done in conventional lamp applications practice. However this present discovery demonstrated that with a highly thermal loaded chamber a direct air flow may be utilized to cool the chamber and the seals. The result is an increase in lamp life of 3 to 6 times that of an uncooled chamber. Further, it was observed that this could be achieved and controlled by direction and airspeed. Airspeed may be controlled through fan size and/or fan speed modulation. The resultant failure modes either changed or were much later in lamp life. There were fewer chamber failures and the onset of chamber devitrification was much later in lamp life. It was further observed that by controlling the airflow so as not to overcool, the instability of lumen output of the lamp could be less than 5% and is typically around 1.5%. This is truly astounding considering that airflow is directed at the arc chamber.

This invention has been modeled in the 25, 50 and 60 watt enclosed light system applications, and the result continues to repeat. This unconventional approach to cooling is the difference between success and failure in the terms of lamp life in an installed system. It has broken a past paradigm.

The ambient air flow is allowed to pass through the housing in direct contact with the lamp chamber at a critical angle from the vertical, lamp thermal control is effected, resulting in a dramatic increase in lamp life and a reduction in infant mortality of the lamp. As further illustrated in FIGS. 1 and 2, an air intake is formed at 35 in the bottom portion of the casing at an angle of approximately 12–22° from the vertical, which provides for ambient air flow into and through the interior volume 26 of the reflector over the lamp chamber 16 and out of the interior volume of the reflector through fan exhaust 36. The air flow is illustrated by the dotted arrows in the drawings with the fan being operated on exhaust. The angle from the vertical for the air flow is dictated by the geometry of the reflector which requires an angled air flow to allow the air to pass directly into the area defined in the internal walls of the reflector. This design is created in that it insures that there will be a flow of air directly over lamp chamber which is positioned within this area to accomplish the objectives of the invention. Opening 35 maybe conveniently formed by an elongated slot which typically constitutes about 25–50% of the casing floor width. The heated air passing toward fan exhaust 36 is mixed with a stream of cooler ambient air which is introduced through opening or waste gate 37 positioned at the top surface of the module. This results in an overall cooling of the air stream which exits through fan exhaust 36. The reduction in the air flow temperature significantly reduces the thermal stress on the adjacent fan, thereby significantly increasing fan life.

In an alternative embodiment of the present invention, the sealed light module may be employed within an outer housing or light box to provide for a lighting system.

The process of the present invention provides a solution and overcomes the problem of the prior art in which in systems of this type, lamp failure is caused by the onset of devitrification of the lamp chamber due to the high temperatures generated by the lamp assembly during operation. Through the use of this process, the anode temperature dropped approximately 50–70° C., and the cathode temperature dropped approximately 30–40° C. with the waste gate functioning to reduce the thermal stress on the fan, thereby increasing fan life.

Figure 3:
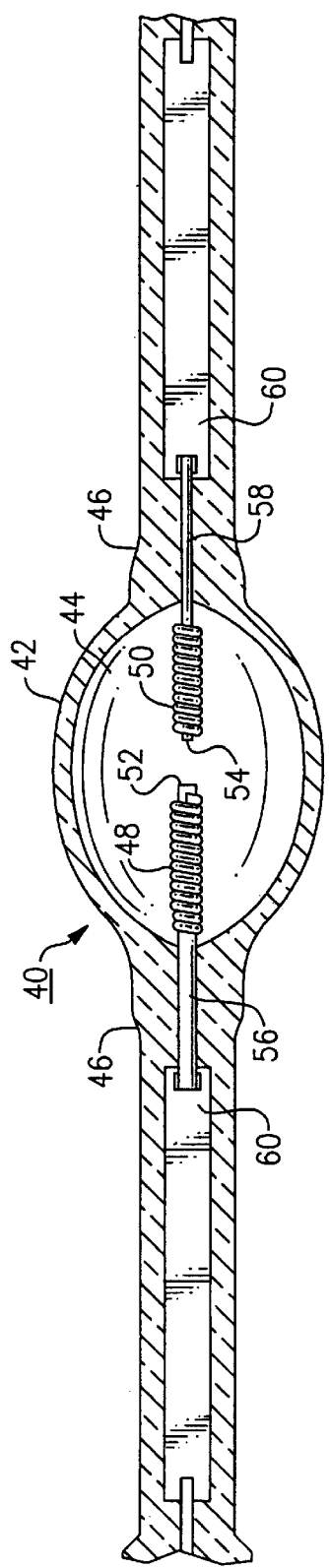
FIG. 3 is a detailed side sectional view of a typical metal halide arc lamp which is treated by the present invention.

FIG. 3 of the drawings illustrates a typical or conventional arc lamp 40 which is used and treated by the present invention. The lamp depicted in FIG. 3 includes a chamber or envelope 42 which is typically made of a quartz glass having an internal volume 44, neck portions 46 and a pair of electrodes 48 (anode) and 50 (cathode) having tip portions 52 and 54, and shank portions 56 and 58, respectively. Typically each end of the shank is connected to a metal foil 60, usually made of molybdenum. The internal volume 44 of chamber 42 typically contains mercury and metal halide material.

The quantity of mercury is added such that it will evaporate and enter the discharge in a gaseous state and regulate the electrical operational parameters. The amount of mercury can range from 1 to 15 milligrams and is a function of the internal volume of the envelope.

The metal halide material is a mixture of individual compounds selected from the following list which includes but is not limited to cesium iodide, indium iodide, lithium iodide, scandium iodide, sodium iodide, and thalium iodide, in amounts ranging from about 50 to 1000 micrograms.

The proper mixtures are combined to yield a high luminous efficacy on the order of 60 lumens per watt while maintaining the proper source apparent color temperature of about 5,000 K to 6,000 K. Color balance of the spectral output is achieved utilizing the preferred ranges and provide the red, green and blue colors needed for proper color spectrum.

According to the present invention, employing a directed airflow toward the chamber, such that the airflow is incident upon the chamber as well as the anode seal, achieved lower anode seal temperatures, lower chamber temperatures, rapid thermal equilibrium while not compromising arc stability. By utilizing the metrics of anode seal temperature, lamp voltage, and the measured stability of the arc, the direction of airflow can be tuned to achieve the objectives of the invention.

Flicker or short term instability is of concern in metal halide lamps of the present invention. Instability can be caused by overcooling with a resultant condensing of the mercury vapor and/or the condensing of the metal halide salts. Therefore in establishing any cooling method, stability must be considered.

During the development of the method of directed airflow cooling, instability was considered and measured. This measurement is accomplished as follows; peak to peak lumen output was measured with a sample rate of 5 samples per second, with each sample being of 16 milliseconds duration, and with 1 minute total period of assessment. Instability is then calculated as (highest peak lumens minus lowest peak lumens) divided by (average lumens of all 300 peaks). The result is expressed as a percentage. To accomplish the objectives of the invention instability must be less than about 5% and typically is about 1.5% or less.

In the present invention, thermal equilibrium is the point at which the anode seal temperature is at a reasonable steady value in that it is neither rising nor falling but remains relatively constant. In the present invention the lamp rises in temperature after turn on and will achieve this point of constant value, or thermal equilibrium, after a period of time. Thermal equilibrium is achieved in 50 to 70% less time with the present invention, i.e., about 5 to 15 minutes vs. 30–35 minutes without the method of the present invention.

Figure 4:
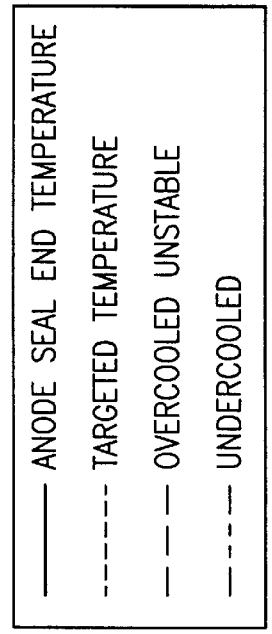
FIG. 4 illustrates a plot of the anode seal end temperature vs. the angle of incidence for a 25 watt metal halide arc lamp.
Figure 4:
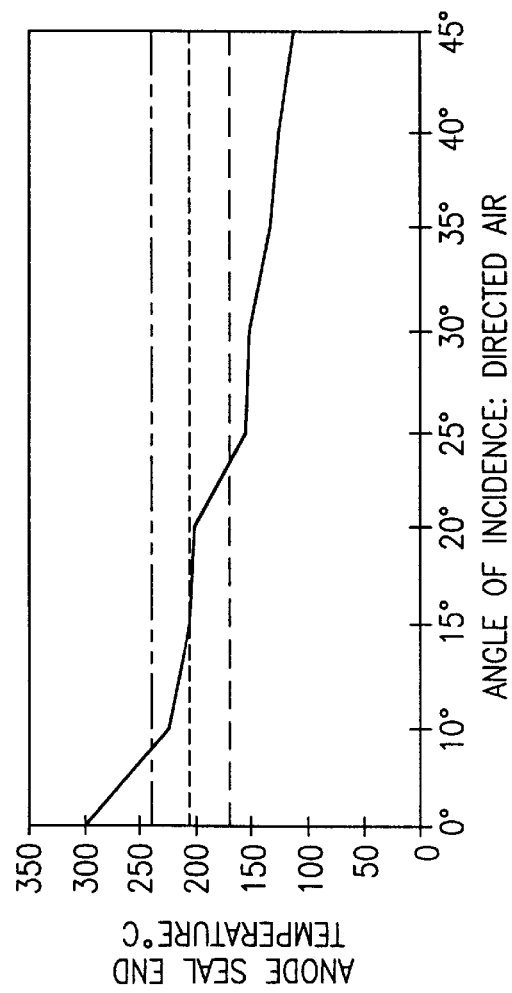
Figure 5:
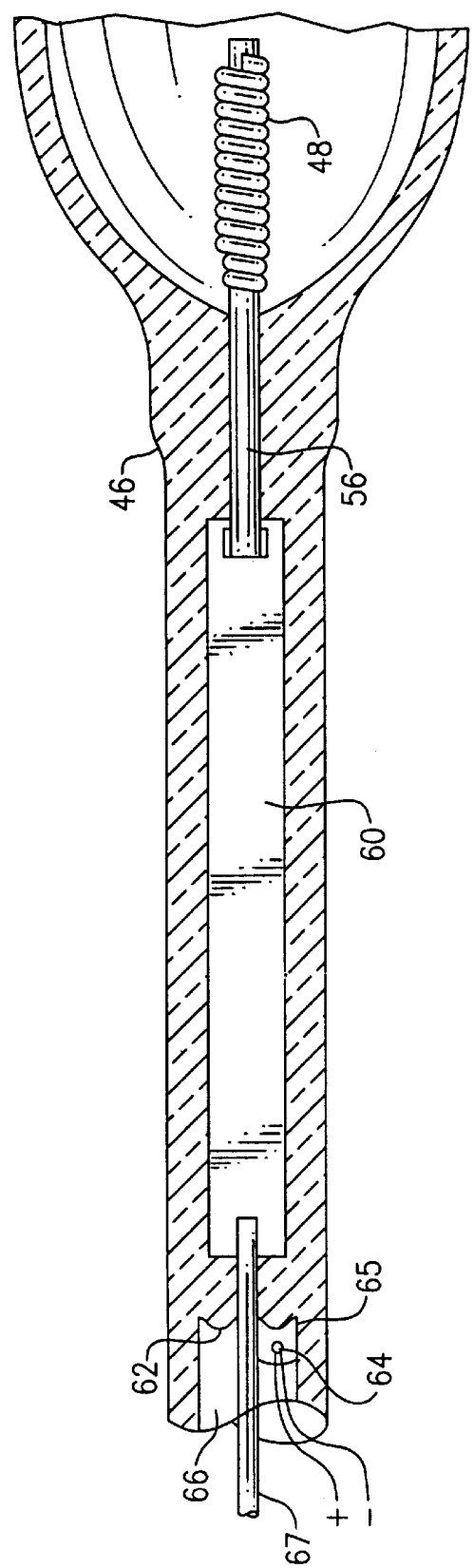
FIG. 5 is an enlarged side sectional view of the anode end of the lamp illustrated in FIG. 3.

Using the instability criteria described above, the ideal temperature for extended lamp life was determined to be centered on 205° C. for the anode seal end and was achieved at an angle of 18 degrees for a 25 watt lamp. FIG. 4 illustrates the anode seal end ideal temperature range for the 25 watt lamp. The angle of incidence for all configurations was determined to be between about 14 and 22 degrees depending on specific lamp size, lamp wattage, and reflector geometry. Using the criterion described above, it was determined that for metal halide lamps in the range of 16 to 60 watts, that the control of the anode seal end temperature in the range of about 170 to 240° C. resulted in a dramatic improvement in lamp performance. A preferred range of about 200 to 210° C. provided optimum results with respect to achieving long life together with stability. This temperature is measured at the anode seal end 62 of the lamp by thermocouple means 64 well known to the art and is illustrated in FIG. 5 of the drawings. In FIG. 5, the thermocouple 64 is connected in place in an opening 66 at the anode seat end 62 by ceramic cement 65. External electrical lead wire 67 is connected to a suitable power source (not shown). By comparison, with a laminar airflow, in a plane parallel with the face of the reflector, the temperatures of the anode could exceed 300° C. and early oxidation and seal delamination would occur. The following table compares infant morality rate and average lamp life experienced in the process of the prior art as compared to the use of the process of the present invention.

TABLE

|  | Prior Art | Invention |
|---|---|---|
| 25 Watt |  |  |
| Average Lamp Life | 350 hours | ~1250 hours |
| Infant Mortality < 100 hours | 3–5% | 0% |
| 60 Watt |  |  |
| Average Lamp Life | 500 | 1750 |
| Infant Mortality < 200 | 3–5% | 0% |

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method for thermal control of a sealed light module which includes an arc lamp and an associated reflector which is enclosed within an outer casing which defines a sealed enclosure which comprises providing a predetermined air flow path within said enclosure whereby a continuous flow of ambient air is passed over said lamp during lamp operation, whereby the anode seal end temperature of said lamp is maintained within a predetermined temperature range which ensures a lamp instability of 5% or less, with said module further including a fan which functions to facilitate said air flow, with said module further including an opening or vent adjacent said fan which draws in additional ambient air to said air flow path which functions to reduce the fan temperature in operation and thereby increase the operating life of the fan.

2. The method of claim 1 in which said air flow is established in a direction substantially vertical to the horizontal axis of said lamp.

3. The method of claim 2 in which the air flow is initiated from the bottom of said casing at an angle of about 15–22° from the vertical.

4. The method of claim 1 in which the anode seal end temperature is in the range of about 200 to 210° C.

5. The method of claim 1 in which the sealed light module is contained within an outer housing.

6. A method for thermal control of a sealed light module which comprises:

(a) providing an arc lamp having a pair of opposed electrodes and an associated reflector contained in an outer casing which defines a sealed enclosure;

(b) disposing said lamp and reflector along a horizontal axis within said sealed enclosure which includes an outlet path for light generated by said lamp;

(c) providing an air flow path within said enclosure which is substantially perpendicular to the horizontal axis of said lamp, to allow ambient air to flow over said lamp chamber; and (d) directing a flow of ambient air along said path during lamp operation, whereby the anode seal end temperature of said lamp is maintained within a predetermined temperature range which ensures a lamp instability of 5% or less, with said module further including a fan which functions to facilitate said air flow, with said module further including an opening or vent adjacent said fan which draws in additional ambient air to said air flow path which functions to reduce the fan temperature in operation and thereby increase the operating life of the fan.

7. The method of claim 6 in which said air flow is established in a direction substantially vertical to the horizontal axis of said lamp.

8. The method of claim 6 in which the air flow is initiated from the bottom of said casing at an angle of about 15–22° from the vertical.

9. The method of claim 6 in which the air flow is initiated at an initial air temperature of about 25° C.

10. The method of claim 6 in which the anode seal end temperature is in the range of about 170 to 240° C.

11. The method of claim 6 in which the sealed light module is contained within an outer housing.

* * * * *